(12) United States Patent
Kang et al.

(10) Patent No.: US 11,718,722 B2
(45) Date of Patent: Aug. 8, 2023

(54) HARD COATING FILM AND IMAGE DISPLAY DEVICE HAVING THE SAME

(71) Applicant: DONGWOO FINE-CHEM CO., LTD., Iksan-si (KR)

(72) Inventors: Min Kyung Kang, Hwaseong-si (KR); Seunghee Kim, Yongin-si (KR); Geo San Lim, Seoul (KR); Jonghan Choi, Hanam-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 57 days.

(21) Appl. No.: 17/472,939

(22) Filed: Sep. 13, 2021

(65) Prior Publication Data

US 2022/0081524 A1    Mar. 17, 2022

(30) Foreign Application Priority Data

Sep. 14, 2020 (KR) .................. 10-2020-0117738

(51) Int. Cl.

| | | |
|---|---|---|
| *C08F 2/46* | (2006.01) | |
| *C08F 2/50* | (2006.01) | |
| *C08G 61/04* | (2006.01) | |
| *C08J 7/046* | (2020.01) | |
| *G02F 1/1333* | (2006.01) | |
| *C08J 7/04* | (2020.01) | |
| *C08F 220/20* | (2006.01) | |
| *C08F 220/22* | (2006.01) | |
| *C08K 5/07* | (2006.01) | |

(52) U.S. Cl.
CPC ............. *C08J 7/046* (2020.01); *C08F 2/50* (2013.01); *C08F 220/20* (2013.01); *C08F 220/22* (2013.01); *C08J 7/0427* (2020.01); *C08K 5/07* (2013.01); *G02F 1/133311* (2021.01); *C08J 2367/02* (2013.01)

(58) Field of Classification Search
CPC .... C08F 220/22; C08F 220/20; C08F 220/24; C08F 2/48; C08F 2/50; C08F 222/103; C08F 222/1006; C09D 4/00; C08K 5/07; C08J 7/046; C08J 7/0427; C08J 2367/00; C08J 2433/14; C08J 2367/02; G02F 1/133311

USPC ........... 522/42, 33, 6, 189, 184, 71, 1; 520/1
See application file for complete search history.

(56) References Cited

U.S. PATENT DOCUMENTS

2013/0120838 A1*  5/2013  Kim .................... C09D 135/02
977/773

FOREIGN PATENT DOCUMENTS

| JP | 2010-243700 A | | 10/2010 |
|---|---|---|---|
| JP | 2011-043606 A | | 3/2011 |
| JP | 2011043606 | * | 3/2011 |
| JP | 2013-001896 A | | 1/2013 |
| JP | 2018-124395 A | | 8/2018 |
| KR | 10-2005-0010064 A | | 1/2005 |
| KR | 10-2010-0129512 A | | 12/2010 |
| KR | 10-2011-0044797 A | | 4/2011 |
| KR | 10-2012-0103717 A | | 9/2012 |
| KR | 10-2019-0094841 A | | 8/2019 |

OTHER PUBLICATIONS

Abe, JP 2011-043606 Machine Translation, Mar. 3, 2011 (Year: 2011).*

* cited by examiner

*Primary Examiner* — Jessica Whiteley
(74) *Attorney, Agent, or Firm* — Sughrue Mion, PLLC

(57) ABSTRACT

A hard coating film comprises a substrate, and a hard coating layer formed on at least one surface of the substrate, wherein the hard coating layer is formed from a hard coating composition comprising a hydroxyl group-containing light-transmitting resin, a fluorine-based UV-curable functional group-containing compound, a photoinitiator, and a solvent, and when measured by X-ray photoelectron spectroscopy (XPS) on a surface of the hard coating layer, atomic percent of elemental fluorine (F) on the surface of the hard coating layer is 10 to 55 at %. The hard coating film uses a hard coating composition including a hydroxyl group-containing light-transmitting resin and a fluorine-based UV-curable functional group-containing compound to control the atomic percent of the elemental fluorine (F) on the surface of the hard coating layer to a specific range, thereby providing excellent antifouling properties together with good wear resistance, scratch resistance, and bending resistance.

11 Claims, No Drawings

HARD COATING FILM AND IMAGE DISPLAY DEVICE HAVING THE SAME

CROSS REFERENCE TO RELATED APPLICATIONS

This application claims priority based on Korean Patent Application No. 10-2020-0117738, filed Sep. 14, 2020, the content of which is incorporated herein by reference in its entirety.

TECHNICAL FIELD

The present invention relates to a hard coating film and an image display device having the same. Particularly, the present invention provides a hard coating film having excellent antifouling properties, wear resistance, scratch resistance, and bending resistance, and an image display device having the hard coating film.

BACKGROUND ART

A hard coating film has been used for protecting the surface of various image display devices including a liquid crystal display device (LCD), an electroluminescence (EL) display, a plasma display (PD), a field emission display (FED) and the like.

Such a hard coating film should have high hardness and good scratch resistance, without curling in the end thereof during its production or use. Recently, a flexible display or a foldable display gains attention as a next-generation display device for the reason that it applies flexible materials such as plastics or ultra-thin glasses (UTGs), instead of a glass substrate having no flexibility, thereby maintaining display performances even though it is bent like paper. Accordingly, the hard coating film is also required to have proper bending resistance to be applicable to a flexible display or a foldable display so as to prevent the generation of crack.

Since the hard coating film is often used while being disposed at the outermost part of the display, mechanical properties such as wear resistance and scratch resistance, as well as antifouling properties related to resistance to marks by fingerprints, markers, etc. and/or easy removal are also required as the major performance.

Korean Patent Application Publication No. 10-2005-0010064 discloses an object with a composite hard coating layer and a method of forming the composite hard coating layer. The object specifically includes a hard coating layer installed on the surface of the object and an antifouling surface layer installed on the surface of the hard coating layer. The hard coating layer is a cured product of a hard coating composition containing an active energy ray-curable compound, the antifouling surface layer is a cured product of a surface material containing a polyfunctional (meth)acrylate compound containing fluorine and a monofunctional (meth)acrylate compound containing fluorine, and the antifouling surface layer is adhered to the hard coating layer.

However, in the case of the above technology, since the hard coating layer and the antifouling layer must be introduced onto a polymer base film, respectively, the process is complicated, and there is a price rise problem due to a decrease in yield and an increase in process cost.

Furthermore, as the demand for an ultra-thin display rises, the development of a hard coating film having a hard coating layer capable of simultaneously exhibiting antifouling properties together with wear resistance and scratch resistance as a single layer is required.

DISCLOSURE

Technical Problem

It is an object of the present invention to provide a hard coating film having excellent antifouling properties together with good wear resistance, scratch resistance, and bending resistance.

It is another object of the present invention to provide an image display device having the hard coating film.

Technical Solution

In accordance with one aspect of the present invention, there is provided a hard coating film, comprising:
a substrate; and
a hard coating layer formed on at least one surface of the substrate,
wherein the hard coating layer is formed from a hard coating composition comprising a hydroxyl group-containing light-transmitting resin, a fluorine-based UV-curable functional group-containing compound, a photoinitiator, and a solvent, and
when measured by X-ray photoelectron spectroscopy (XPS) on a surface of the hard coating layer, atomic percent of elemental fluorine (F) on the surface of the hard coating layer is 10 to 55 at %.

In one embodiment of the present invention, the hydroxyl group-containing light-transmitting resin may include a hydroxyl group-containing (meth)acrylate compound.

In one embodiment of the present invention, the hydroxyl group-containing light-transmitting resin may be contained in an amount of 1 to 50 wt % based on 100 wt % of the total hard coating composition.

In one embodiment of the present invention, the fluorine-based UV-curable functional group-containing compound may include one or more selected from the group consisting of (meth)acrylate containing perfluoroalkyl group, (meth)acrylate containing perfluoropolyether group, (meth)acrylate containing perfluorocyclicaliphatic group, and (meth)acrylate containing perfluoroaromatic group.

In one embodiment of the present invention, the fluorine-based UV-curable functional group-containing compound may be contained in an amount of 1 to 40 wt % based on 100 wt % of the total hard coating composition.

In one embodiment of the present invention, the hard coating layer may have a water contact angle of 100° or more after rubbing 3,000 times under a load of 1 kg using an eraser and a weight.

In accordance with another aspect of the present invention, there is provided an image display device having the above hard coating film.

In accordance with yet another aspect of the present invention, there is provided a window of a flexible display device having the above hard coating film.

In accordance with yet another aspect of the present invention, there is provided a polarizing plate having the above hard coating film.

In accordance with yet another aspect of the present invention, there is provided a touch sensor having the above hard coating film.

Advantageous Effects

The hard coating film of the present invention uses a hard coating composition including a hydroxyl group-containing light-transmitting resin and a fluorine-based UV-curable functional group-containing compound to control the atomic percent of the elemental fluorine (F) on the surface of the hard coating layer to a specific range, thereby providing excellent antifouling properties together with good wear resistance and scratch resistance. The hard coating film according to an embodiment of the present invention has excellent bending resistance, and thus it can be effectively used in a flexible display device or a foldable display device.

BEST MODE

The present invention is, hereinafter, described in more detail.

One embodiment of the present invention relates to a hard coating film, comprising a substrate and a hard coating layer formed on at least one surface of the substrate, wherein the hard coating layer is formed from a hard coating composition comprising a hydroxyl group-containing light-transmitting resin, a fluorine-based UV-curable functional group-containing compound, a photoinitiator, and a solvent, and when measured by X-ray photoelectron spectroscopy (XPS) on a surface of the hard coating layer, atomic percent of elemental fluorine (F) on the surface of the hard coating layer is 10 to 55 at %.

The hard coating film according to one embodiment of the present invention uses a hard coating composition comprising a hydroxyl group-containing light-transmitting resin and a fluorine-based UV-curable functional group-containing compound to form the hard coating layer, thereby providing antifouling properties together with good wear resistance. Specifically, the hydroxyl group of the hydroxyl group-containing light-transmitting resin acts as a repulsion towards the fluorine atom of the fluorine-based UV-curable functional group-containing compound so that the fluorine atom is oriented to the surface of the hard coating layer, which controls the atomic percent of the elemental fluorine (F) on the surface of the hard coating layer to be 10 to 55 at % level. Therefore, it is possible to exhibit not only antifouling properties, but also wear resistance and scratch resistance. In particular, the hydroxyl group-containing light-transmitting resin can improve the wear resistance of the hard coating layer by forming a matrix of the hard coating layer by photocuring.

Accordingly, the hard coating film according to one embodiment of the present invention may have a hard coating layer capable of simultaneously exhibiting antifouling properties with wear resistance and scratch resistance as a single layer, which can be advantageously applied to ultra-thin displays.

Furthermore, the hard coating film according to one embodiment of the present invention has an excellent bending resistance so that film breakage or hard coating layer peeling does not occur even if the film is repeatedly folded and unfolded 200,000 times with a radius of curvature of 1 mm with the hard coating layer folding inward, which can be advantageously applied to flexible displays or foldable displays.

In the hard coating film according to one embodiment of the present invention, atomic percent of elemental fluorine (F) on a surface of the hard coating layer is 10 to 55 at %, preferably 15 to 55 at %, and more preferably 15 to 50 at % when measured by X-ray photoelectron spectroscopy (XPS) on the surface of the hard coating layer. If the atomic percent of the elemental fluorine (F) on the surface of the hard coating layer is less than 10 at %, antifouling properties and wear resistance may deteriorate, and if it exceeds 55 at %, scratch resistance may deteriorate.

The atomic percent of the elemental fluorine (F) on the surface of the hard coating layer is a value measured by X-ray photoelectron spectroscopy (XPS) on the surface of the hard coating layer according to the method described in Experimental Examples to be described later.

The hard coating film according to one embodiment of the present invention includes a substrate and a hard coating layer formed on at least one surface of the substrate.

In one embodiment of the present invention, the substrate is not limited if it is a substrate used in the art, and specifically, a film having good transparency, mechanical strength, thermal stability, moisture shielding property, isotropy, etc. may be used. Specific examples of the substrate may include a film made of thermoplastic resins, e.g., polyester resins such as polyethylene terephthalate, polyethylene isophthalate, polyethylene naphthalate and polybutylene terephthalate; cellulose resins such as diacetylcellulose and triacetylcellulose; polycarbonate resins; acrylate resins such as polymethyl (meth)acrylate and polyethyl (meth)acrylate; styrene resins such as polystyrene and acrylonitrile-styrene copolymer; polyolefin resins such as polyethylene, polypropylene, polyolefin having a cyclic or norbornene structure, and ethylene-propylene copolymer; vinyl chloride resins; amide resins such as nylon and aromatic polyamide; imide resins; sulfone resins; polyethersulfone resins; polyether ether ketone resins; polyphenylene sulfide resins; vinyl alcohol resins; vinylidene chloride resins; vinyl butyral resins; allylate resins; polyoxymethylene resins; and epoxy resins. Also, a film consisting of a blend of the thermoplastic resins may be used. In addition, a film made of an ultraviolet curable resin or a thermosetting resin such as (meth)acrylic, urethane, acrylic urethane, epoxy or silicone, or UTG (ultra-thin glass) may be used. According to one embodiment of the present invention, a polyimide-based resin or a polyester-based resin that has excellent durability against repeated bending may be used to be easily applied to a flexible display device.

The thickness of the substrate is not particularly limited, but may be 8 to 1,000 μm, specifically 20 to 150 μm. If the thickness of the substrate is less than 8 μm, the strength of the film is lowered so that workability deteriorates, and when it exceeds 1.000 μm, there are problems that the transparency is lowered or the weight of the hard coating film increases.

In one embodiment of the present invention, the hard coating layer may be formed by applying a hard coating composition on at least one surface of the substrate.

Since the hard coating layer exhibits antifouling properties, it may be difficult to attach to an optical layer or panel disposed below when it is formed on the opposite surface of the viewing side of the substrate. Therefore, the hard coating layer may preferably be formed as a single layer on the viewing side of the substrate.

In one embodiment of the present invention, the hard coating composition comprises a hydroxyl group-containing light-transmitting resin, a fluorine-based UV-curable functional group-containing compound, a photoinitiator, and a solvent.

In one embodiment of the present invention, the hydroxyl group-containing light-transmitting resin is a photocurable resin, and the photocurable resin may include a hydroxyl group-containing (meth)acrylate compound.

Examples of the hydroxyl group-containing (meth)acrylate compound may include 2-hydroxyethyl (meth)acrylate, 2-hydroxypropyl (meth)acrylate, 2-hydroxybutyl (meth)

acrylate, 2-hydroxy-3-phenyloxypropyl (meth)acrylate, 1,4-butanediol mono(meth)acrylate, 2-hydroxyalkyl (meth)acryloyl phosphate (herein, alkyl is methyl, ethyl, or propyl, for example), 4-hydroxycyclohexyl (meth)acrylate, 1,6-hexanediol mono(meth)acrylate, neopentylglycol mono (meth)acrylate, trimethylolpropane di(meth)acrylate, trimethylolethane di(meth)acrylate, pentaerythritol tri(meth)acrylate, dipentaerythritol penta(meth)acrylate, etc. These may be used alone or in combination of two or more.

The hydroxyl group-containing light-transmitting resin may be contained in an amount of 1 to 50 wt %, preferably 5 to 50 wt %, based on 100 wt % of the total hard coating composition. If the content of the hydroxyl group-containing light-transmitting resin is less than 1 wt %, wear resistance may deteriorate, and it may be difficult to achieve sufficient hardness improvement. If it exceeds 50 wt %, curling problem may become severe.

In one embodiment of the present invention, the fluorine-based UV-curable functional group-containing compound is a component that imparts antifouling properties, wear resistance and chemical resistance. The fluorine-based UV-curable functional group-containing compound is not particularly limited as long as it contains fluorine together with a UV-curable functional group so as to chemically bond to the hydroxyl group-containing light-transmitting resin forming the matrix of the hard coating layer.

As the fluorine-based UV-curable functional group-containing compound, one or more selected from the group consisting of (meth)acrylate containing a perfluoroalkyl group, (meth)acrylate containing a perfluoropolyether group, (meth)acrylate containing a perfluorocyclicaliphatic group, and (meth)acrylate containing a perfluoroaromatic group may be used. In this case, it shows excellent antifouling performance, and at the same time it has the advantage of excellent durability to maintain the antifouling performance for a long time even after repeated use by forming a chemical bond with the hard coating layer.

The fluorine-based UV-curable functional group-containing compound preferably has 1 to 6 UV-curable functional groups.

The fluorine-based UV-curable functional group-containing compound may be contained in an amount of 1 to 40 wt %, preferably 2 to 40 wt %, and more preferably 10 to 40 wt %, based on 100 wt % of the total hard coating composition. If the content of the fluorine-based UV-curable functional group-containing compound is within the above range, it is preferable because excellent wear resistance and antifouling effect can be imparted. When the content of the UV-curable functional group-containing compound is less than the above range, it may be difficult to sufficiently promote wear resistance or antifouling properties, and when it exceeds the above range, hardness and/or scratch resistance may be reduced.

In one embodiment of the present invention, the photoinitiator is included for inducing photocuring of the hard coating composition, and it may include, for example, a photo-radical initiator capable of forming radicals by irradiation with light.

Examples of the photoinitiator may include a Type I initiator in which radicals are generated by decomposition of molecules due to a difference in chemical structure or molecular binding energy, a Type II initiator in which tertiary amines are incorporated as a co-initiator to induce hydrogen abstraction, or the like.

For example, the Type I initiator may include acetophenones such as 4-phenoxydichloroacetophenone, 4-t-butyldichloroacetophenone, 4-t-butyltrichloroacetophenone, diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-hydroxy-2-methylpropan-1-one, 4-(2-hydroxyethoxy)-phenyl(2-hydroxy-2-propyl)ketone, 1-hydroxycyclohexyl phenyl ketone or the like, benzoins such as benzoin, benzoin methyl ether, benzoin ethyl ether, benzyl dimethyl ketal or the like, phosphine oxides, and titanocene compounds.

For example, the Type II initiator may include benzophenones such as benzophenone, benzoyl benzoic acid, benzoyl benzoic acid methyl ether, 4-phenylbenzophenone, hydroxybenzophenone, 4-benzoyl-4'-methyldiphenylsulfide, 3,3'-methyl-4-methoxybenzophenone or the like, and thioxanthones such as thioxanthone, 2-chlorothioxanthone, 2-methylthioxanthone, 2,4-dimethylthioxanthone, isopropylthioxanthone or the like.

These photoinitiators may be used alone or in combination of two or more. In addition, Type I and Type II initiators can be used alone or together.

The photoinitiator may be contained in an amount of 0.1 to 10 wt %, preferably 0.1 to 5 wt %, based on 100 wt % of the total hard coating composition. If the amount of the photoinitiator is less than 0.1 wt %, the curing does not proceed sufficiently and thus it may be difficult to realize the mechanical properties and adhesive strength of the hard coating film or the hard coating layer. If the amount of the photoinitiator exceeds 10 wt %, cracks, curling, and adhesion failure due to curing shrinkage may occur.

In one embodiment of the present invention, the solvent may be, without limitation, any one being known in the art to be capable of dissolving or dispersing the above-mentioned compositions. In addition, the solvent serves to provide time for the fluorine-based UV-curable functional group-containing compound to float to the outermost surface of the coating layer due to a difference in surface tension in the process of applying the hard coating composition on the substrate and drying it.

Examples of the solvent may include alcohols (methanol, ethanol, isopropanol, butanol, methyl cellosolve, ethyl cellosolve, etc.), ketones (methyl ethyl ketone, methyl butyl ketone, methyl isobutyl ketone, diethyl ketone, dipropyl ketone, cyclohexanone, etc.), acetates (ethyl acetate, propyl acetate, n-butyl acetate, t-butyl acetate, methyl cellosolve acetate, ethyl cellosolve acetate, propylene glycol monomethyl ether acetate, propylene glycol monoethyl ether acetate, propylene glycol monopropyl ether acetate, methoxybutyl acetate, methoxypentyl acetate, etc.), hexanes (hexane, heptane, octane, etc.), benzenes (benzene, toluene, xylene, etc.), ethers (diethylene glycol dimethyl ether, diethylene glycol diethyl ether, diethylene glycol dipropyl ether, diethylene glycol dibutyl ether, propylene glycol monomethyl ether, etc.). These solvents may be used alone or in combination of two or more.

The solvent may be contained in an amount of 10 to 50 wt %, preferably 20 to 50 wt %, based on 100 wt % of the total hard coating composition. If the content of the solvent is less the above range, not only does the workability deteriorate due to high viscosity, but also the swelling of the substrate cannot sufficiently progress. Conversely, when it exceeds the above range, it takes a lot of time in the drying process and economic efficiency is low. Accordingly, it may be appropriately used within the above range.

In one embodiment of the present invention, the hard coating composition may further comprise another light-transmitting resin in addition to the hydroxyl group-containing light-transmitting resin.

The other light-transmitting resin may include a photocurable (meth)acrylate oligomer and/or monomer.

As the photocurable (meth)acrylate oligomer, epoxy (meth)acrylate, urethane (meth)acrylate, etc. are commonly used, and urethane (meth)acrylate is preferable. Urethane (meth)acrylate may be prepared by reacting (meth)acrylate having a hydroxyl group in the molecule and a compound having an isocyanate group in the presence of a catalyst. Specific examples of the (meth)acrylate having a hydroxyl group in the molecule may include 2-hydroxyethyl (meth)acrylate, 2-hydroxyisopropyl (meth)acrylate, 4-hydroxybutyl (meth)acrylate, caprolactone ring-opened hydroxy acrylate, pentaerythritol tri(meth)acrylate, pentaerythritol tetra(meth)acrylate, dipentaerythritol penta(meth)acrylate, dipentaerythritol hexa(meth)acrylate, etc. Also, specific examples of the compound having an isocyanate group may include 1,4-diisocyanatobutane, 1,6-diisocyanatohexane, 1,8-diisocyanatooctane, 1,12-diisocyanatododecane, 1,5-diisocyanato-2-methylpentane, trimethyl-1,6-diisocyanatohexane, 1,3-bis(isocyanatomethyl)cyclohexane, trans-1,4-cyclohexene diisocyanate, 4,4'-methylenebis(cyclohexyl isocyanate), isophorone diisocyanate, toluene-2,4-diisocyanate, toluene-2,6-diisocyanate, xylene-1,4-diisocyanate, tetramethylxylene-1,3-diisocyanate, 1-chloromethyl-2,4-diisocyanate, 4,4'-methylenebis(2,6-dimethylphenyl isocyanate), 4,4'-oxybis(phenyl isocyanate), trifunctional isocyanate derived from hexamethylene diisocyanate, and trimethylol propane-toluene diisocyanate adduct, etc.

The monomer is not limited if it is typically used in the art. Monomers having an unsaturated group such as a (meth)acryloyl group, a vinyl group, a styryl group, an allyl group, etc. as a photocurable functional group in the molecule are preferable, and among these, a monomer having a (meth)acryloyl group is preferable.

Specific examples of the monomer having a (meth)acryloyl group may include neopentyl glycol acrylate, 1,6-hexanediol di(meth)acrylate, propylene glycol di(meth)acrylate, triethylene glycol di(meth)acrylate, dipropylene glycol di(meth)acrylate, polyethylene glycol di(meth)acrylate, polypropylene glycol di(meth)acrylate, trimethylolpropane tri(meth)acrylate, trimethylolethane tri(meth)acrylate, 1,2,4-cyclohexane tetra(meth)acrylate, pentaerythritol tetra(meth)acrylate, dipentaerythritol hexa(meth)acrylate, isooctyl (meth)acrylate, isodecyl (meth)acrylate, stearyl (meth)acrylate, tetrahydrofurfuryl (meth)acrylate, phenoxyethyl (meth)acrylate, isoborneol (meth)acrylate, etc.

The photocurable (meth)acrylate oligomer and monomer exemplified above may be used alone or in combination of two or more.

The amount of another light-transmitting resin is not particularly limited, but it may be contained in an amount of equal to or less than 50 wt %, for example 1 to 50 wt %, based on 100 wt % of the total hard coating composition. When another light-transmitting resin is included in an amount of more than 50 wt %, it may be difficult to control the atomic percent of the elemental fluorine (F) on the surface of the hard coating layer to a level of 10 to 55 at %, or a problem of severe curling may occur.

The hard coating composition, if necessary, may further comprise other components which have been conventionally used in the art, e.g., a leveling agent, a UV stabilizer, a thermal stabilizer, an antioxidant, a surfactant, a lubricant, an anti-fouling agent, etc.

The hard coating layer can be formed by coating the hard coating composition on one or both surfaces of the substrate followed by drying and UV curing.

The hard coating composition may be coated on the substrate by suitably using a known coating process such as die coater, air knife, reverse roll, spray, blade, casting, gravure, micro gravure, spin coating, etc.

After the hard coating composition is coated on the substrate, a drying process may be carried out by vaporizing volatiles at a temperature of 30 to 150° C. for 10 seconds to one hour, more specifically 30 seconds to 30 minutes, followed by UV curing. The irradiation amount of the UV light may specifically be about 0.01 to 10 $J/cm^2$, more specifically 0.1 to 2 $J/cm^2$.

At this time, the thickness of the hard coating layer to be formed may be specifically 2 to 30 μm, more specifically 3 to 20 μm, preferably 2 to 8 μm, and more preferably 2 to 7 μm. When the thickness of the hard coating layer is included in the above range, excellent hardness and bending resistance can be obtained.

One embodiment of the present invention relates to an image display device having the above-described hard coating film. For example, the hard coating film of the present invention may be used as a window of the image display device, especially a flexible display device or a foldable display device. Further, the hard coating film of the present invention may be used by attaching to a polarizing plate or a touch sensor, especially a polarizing plate or a touch sensor for a flexible display device or a foldable display device.

The hard coating film according to one embodiment of the present invention may be used in reflective, transmissive, and transflective liquid crystal devices (LCDs), or LCDs of various operation modes, including twisted nematic (TN), super-twisted nematic (STN), optically compensated bend (OCB), hybrid-aligned nematic (HAN), vertical alignment (VA), and in-plane switching (IPS). Also, the hard coating film according to one embodiment of the present invention may be used in various image display devices, including plasma displays, field emission displays, organic EL displays, inorganic EL displays, electronic paper and the like.

Hereinafter, the present invention will be described in more detail with reference to Examples, Comparative Examples and Experimental Examples. It should be apparent to those skilled in the art that these Examples, Comparative Examples and Experimental Examples are for illustrative purposes only, and the scope of the present invention is not limited thereto.

Preparation Examples and Comparative Preparation Examples: Preparation of Hard Coating Composition Respective components in the composition of Tables 1 and 2 below were mixed using a stirrer and then filtered with a polypropylene (PP) filter to prepare a hard coating composition (wt %).

TABLE 1

|  |  | Preparation Examples |  |  |  |  |  |  |
|---|---|---|---|---|---|---|---|---|
|  |  | 1 | 2 | 3 | 4 | 5 | 6 | 7 |
| Hydroxyl group-containing light-transmitting resin | A-1 | 20.25 | 22.25 | 13.25 | 22.25 |  | 15.75 | 19.75 |
|  | A-2 |  |  |  | 22.25 | 20.25 |  |  |

TABLE 1-continued

| | | Preparation Examples | | | | | | |
|---|---|---|---|---|---|---|---|---|
| | | 1 | 2 | 3 | 4 | 5 | 6 | 7 |
| Other light-transmitting resin | B-1 | 20.25 | 22.25 | 13.25 | | | | |
| | B-2 | | | | | 20.25 | 15.75 | |
| | B-3 | | | | | | | 19.75 |
| UV-curable functional group-containing compound | C-1 | 26 | | | 10 | | | 31 |
| | C-2 | | 10 | | | 30 | | |
| | C-3 | | | 20 | | | 15 | |
| | C-4 | | | | | | | |
| Photoinitiator | D-1 | 3.5 | 3.5 | 3.5 | 3.5 | 3.5 | 3.5 | 3.5 |
| Solvent | E-1 | 30 | 42 | 50 | 42 | 26 | 50 | 26 |

TABLE 2

| | | Comparative Preparation Examples | | | | | |
|---|---|---|---|---|---|---|---|
| | | 1 | 2 | 3 | 4 | 5 | 6 |
| Hydroxyl group-containing light-transmitting resin | A-1 | 20.75 | | 21.75 | | 13.25 | 0.5 |
| | A-2 | | | | 19.05 | | |
| Other light-transmitting resin | B-1 | | | | | 13.25 | 40 |
| | B-2 | | 21 | | | | |
| | B-3 | 20.75 | 21 | 21.75 | 19.05 | | |
| UV-curable functional group-containing compound | C-1 | | | | | | |
| | C-2 | | 23 | | | | 26 |
| | C-3 | 0.5 | | | 42 | | |
| | C-4 | | | 3 | | 20 | |
| Photoinitiator | D-1 | 3.5 | 3.5 | 3.5 | 3.5 | 3.5 | 3.5 |
| Solvent | E-1 | 54.5 | 31.5 | 50 | 16.4 | 50 | 30 |

A-1: 3-functional acrylate (Miramer M340 from Miwon Specialty Chemical)

A-2: 5-functional acrylate (SR399LV NS from Sartomer)

B-1: 6-functional urethane acrylate (UA-110H from Shin-Nakamura Chemical)

B-2: 6-functional acrylate (DPHA NS from Sartomer)

B-3: 6-functional acrylate (UA-1100H from Shin-Nakamura Chemical)

C-1: fluorine-based UV-curable functional group-containing compound (KY-1203 from Shin-Etsu Chemical, 80 wt % MEK (methyl ethyl ketone) dilution, solid content 20 wt %)

C-2: fluorine-based UV-curable functional group-containing compound (DAC-HP from Daikin, 80 wt % mixed solvent of fluorine-based solvent (1,1,2,2,3,4-heptafluorocyclopentane) and solvent (1-methoxy-2-propanol) (50 wt % and 30 wt %, respectively) dilution, solid content 20 wt %)

C-3: fluorine-based UV-curable functional group-containing compound (FS-7026 from Fluoro Technology)

C-4: silicone-based UV-curable functional group-containing compound (BYK UV3570 from BYK Chemie)

D-1: 1-hydroxycyclohexylphenyl ketone

E-1: methyl ethyl ketone

Example 1: Preparation of Hard Coating Film

The hard coating composition prepared in Preparation Example 1 was coated on a polyester film (PET, 50 μm) to have a thickness of 5 μm after curing, the solvent was dried, and the composition was cured by irradiation with an integrated amount (600 mJ/cm$^2$) of UV light to produce a hard coating film.

Example 2: Preparation of Hard Coating Film

A hard coating film was prepared in the same manner as in Example 1, except that the hard coating composition of Preparation Example 2 was used instead of the hard coating composition of Preparation Example 1.

Example 3: Preparation of Hard Coating Film

A hard coating film was prepared in the same manner as in Example 1, except that the hard coating composition of Preparation Example 3 was used instead of the hard coating composition of Preparation Example 1.

Example 4: Preparation of Hard Coating Film

A hard coating film was prepared in the same manner as in Example 1, except that the hard coating composition of Preparation Example 4 was used instead of the hard coating composition of Preparation Example 1.

Example 5: Preparation of Hard Coating Film

A hard coating film was prepared in the same manner as in Example 1, except that the hard coating composition of Preparation Example 5 was used instead of the hard coating composition of Preparation Example 1.

Example 6: Preparation of Hard Coating Film

A hard coating film was prepared in the same manner as in Example 1, except that the hard coating composition of Preparation Example 6 was used instead of the hard coating composition of Preparation Example 1.

Example 7: Preparation of Hard Coating Film

A hard coating film was prepared in the same manner as in Example 1, except that the hard coating composition of Preparation Example 7 was used instead of the hard coating composition of Preparation Example 1.

Comparative Example 1: Preparation of Hard Coating Film

A hard coating film was prepared in the same manner as in Example 1, except that the hard coating composition of Comparative Preparation Example 1 was used instead of the hard coating composition of Preparation Example 1.

Comparative Example 2: Preparation of Hard Coating Film

A hard coating film was prepared in the same manner as in Example 1, except that the hard coating composition of Comparative Preparation Example 2 was used instead of the hard coating composition of Preparation Example 1.

Comparative Example 3: Preparation of Hard Coating Film

A hard coating film was prepared in the same manner as in Example 1, except that the hard coating composition of Comparative Preparation Example 3 was used instead of the hard coating composition of Preparation Example 1.

Comparative Example 4: Preparation of Hard Coating Film

A hard coating film was prepared in the same manner as in Example 1, except that the hard coating composition of Comparative Preparation Example 4 was used instead of the hard coating composition of Preparation Example 1.

Comparative Example 5: Preparation of Hard Coating Film

A hard coating film was prepared in the same manner as in Example 1, except that the hard coating composition of Comparative Preparation Example 5 was used instead of the hard coating composition of Preparation Example 1.

Comparative Example 6: Preparation of Hard Coating Film

A hard coating film was prepared in the same manner as in Example 1, except that the hard coating composition of Comparative Preparation Example 6 was used instead of the hard coating composition of Preparation Example 1.

Experimental Example 1

The physical properties of the films prepared in Examples and Comparative Examples were measured by the methods described below, and the results were shown in Table 3 below.

(1) Surface Elemental Fluorine (F) Content

The surface elemental fluorine (F) content was measured using a Quantera II (Ulvac-PHI) XPS instrument. After preparing the sample of 2 cm×2 cm, it was attached to the XPS exclusive plate using a carbon tape. At this time, the measurement surface was directed upward. The sample was placed in the Intro and maintained at a vacuum degree of $1\times10^{-4}$ Pa for 1 hour or more. After that, it was moved to the main chamber by using an arm, and then maintained at a vacuum degree of $1\times10^{-7}$ Pa for 1 hour or more. After maintaining the high vacuum for 1 hour or more, the surface data was acquired by measuring an arbitrary position on the sample surface three times under the conditions of X-ray (measurement area 200 micron/25 W/15 kV).

(2) Contact Angle

The water contact angle was measured using a contact angle meter DSA100 from KRUSS. The volume of the liquid droplet at room temperature was 3 μl.

(3) Wear Resistance

The wear resistance was measured using a wear resistance meter from Daesung Precision Machine. The water contact angle was measured after the coating surface was rubbed 3000 times using a wear-resistant eraser under a load of 1 kg.

(4) Scratch Resistance

The substrate film was attached to a glass using a transparent adhesive such that the coating surface was oriented upwards, and reciprocating friction was performed 10 times using steel wool (#0000) with a load of 500 g/cm², after which scratch was observed through transmission and reflection of the measurement portion using a triple-wavelength lamp. The scratch resistance was evaluated according to the following evaluation criteria.

<Evaluation Criteria>

○: Scratches are invisible, or 10 or fewer scratches are visible x: More than 10 scratches are visible (5) Adhesion The substrate film was attached to a glass using a transparent adhesive such that the coating surface was oriented upwards, a grid of 100 squares was formed at intervals of 1 mm on the coating surface using a cutter knife, and an adhesion test was performed three times using a Nichiban tape.

The evaluation result was expressed as "the number of squares that are OK after the adhesion test/100".

(6) Bending Resistance

The film was repeatedly folded and unfolded 200,000 times with a radius of curvature of 1 mm so that the hard coating layer was folded inward to observe whether the film was broken and whether the hard coating layer was peeled off. The bending resistance was evaluated according to the following evaluation criteria.

<Evaluation Criteria>

○: Film breakage and hard coating layer peeling did not occur x: Film breakage or hard coating layer peeling occurred

TABLE 3

|  | Surface elemental fluorine (F) content | Contact angle | Wear resistance | Scratch resistance | Adhesion | Bending resistance |
| --- | --- | --- | --- | --- | --- | --- |
| Example 1 | 35 | 109 | 100 | ○ | 100/100 | ○ |
| Example 2 | 20.27 | 110 | 101 | ○ | 100/100 | ○ |
| Example 3 | 30.11 | 111 | 102 | ○ | 100/100 | ○ |
| Example 4 | 20.27 | 109 | 100 | ○ | 100/100 | ○ |
| Example 5 | 41.2 | 113 | 104 | ○ | 100/100 | ○ |
| Example 6 | 25.12 | 110 | 103 | ○ | 100/100 | ○ |
| Example 7 | 48.7 | 117 | 105 | ○ | 100/100 | ○ |
| Comparative Example 1 | 5.9 | 106 | 89 | ○ | 100/100 | ○ |
| Comparative Example 2 | 7 | 107 | 93 | X | 100/100 | ○ |
| Comparative Example 3 | 0 | 97 | 65 | ○ | 100/100 | ○ |
| Comparative Example 4 | 60 | 111 | 85 | X | 100/100 | ○ |
| Comparative Example 5 | 0 | 98 | 61 | X | 100/100 | ○ |
| Comparative Example 6 | 9 | 108 | 92 | X | 100/100 | ○ |

As shown in Table 3 above, the hard coating films of Examples 1 to 7, in which the hard coating layer is formed from a hard coating composition comprising a hydroxyl group-containing light-transmitting resin and a fluorine-based UV-curable functional group-containing compound, and the atomic percent of the elemental fluorine (F) on the surface of the hard coating layer is 10 to 55 at %, according to the present invention, were confirmed that the hard coating films have excellent antifouling properties (contact angle) and excellent wear resistance, scratch resistance, and bending resistance.

On the other hand, the hard coating films of Comparative Examples 1 to 6, formed from a hard coating composition that does not include at least one of the hydroxyl group-containing light-transmitting resin and the fluorine-based UV-curable functional group-containing compound or having the atomic percent of the elemental fluorine (F) on the surface of the hard coating layer out of the range of 10 to 55 at %, could not simultaneously achieve antifouling properties, wear resistance and scratch resistance.

Specifically, the hard coating films of Comparative Examples 1, 2 and 6, in which the atomic percent of the elemental fluorine (F) on the surface of the hard coating layer is less than 10 at %, had poor antifouling properties and wear resistance, and Comparative Example 4 of more than 55 at % had poor scratch resistance. In particular, in the hard coating film of Comparative Example 2, which does not contain a hydroxyl group-containing light-transmitting resin, the atomic percent of the elemental fluorine (F) on the surface of the hard coating layer was less than 10 at % even if it contains an appropriate amount of a fluorine-based UV-curable functional group-containing compound. In addition, the hard coating films of Comparative Examples 3 and 5 using a silicone-based UV-curable functional group-containing compound instead of a fluorine-based UV-curable functional group-containing compound had poor antifouling properties, wear resistance and/or scratch resistance.

Although particular embodiments of the present invention have been shown and described in detail, it will be understood by those skilled in the art that it is not intended to limit the present invention to the preferred embodiments, and it will be obvious to those skilled in the art that various changes and modifications may be made without departing from the spirit and scope of the invention.

The substantial scope of the present invention, therefore, is to be defined by the appended claims and equivalents thereof.

The invention claimed is:

1. A hard coating film comprising:
   a substrate; and
   a hard coating layer formed on at least one surface of the substrate,
   wherein the hard coating layer is formed from a hard coating composition comprising a hydroxyl group-containing light-transmitting resin, a fluorine-based UV-curable functional group-containing compound, a photoinitiator, and a solvent, and
   when measured by X-ray photoelectron spectroscopy (XPS) on a surface of the hard coating layer, atomic percent of elemental fluorine (F) on the surface of the hard coating layer is 10 to 55 at %,
   wherein the hydroxyl group-containing light-transmitting resin is contained in an amount of 1 to 50 wt % based on a total weight of the hard coating composition,
   wherein the fluorine-based UV-curable functional group-containing compound is contained in an amount of 10 to 40 wt % based on the total weight of the hard coating composition, and
   wherein the hard coating layer has a water contact angle of 100° or more after rubbing 3,000 times using an eraser under a load of 1 kg.

2. The hard coating film of claim 1, wherein the hydroxyl group-containing light-transmitting resin includes a hydroxyl group-containing (meth)acrylate compound.

3. The hard coating film of claim 1, wherein the fluorine-based UV-curable functional group-containing compound includes one or more selected from the group consisting of (meth)acrylate containing perfluoroalkyl group, (meth)acrylate containing perfluoropolyether group, (meth)acrylate containing perfluorocyclicaliphatic group, and (meth)acrylate containing perfluoroaromatic group.

4. An image display device having the hard coating film of claim 1.

5. A window of a flexible display device having the hard coating film of claim 1.

6. A polarizing plate having the hard coating film of claim 1.

7. A touch sensor having the hard coating film of claim 1.

8. An image display device having the hard coating film of claim 2.

9. An image display device having the hard coating film of claim 3.

10. A window of a flexible display device having the hard coating film of claim 2.

11. A window of a flexible display device having the hard coating film of claim 4.

* * * * *